United States Patent [19]

Lewis

[11] Patent Number: 4,541,883
[45] Date of Patent: Sep. 17, 1985

[54] METHOD OF SPLICING A THERMOPLASTIC MANDREL AND A MANDREL MADE BY SAID METHOD

[75] Inventor: Charles M. Lewis, Silver Springs Shores, Fla.

[73] Assignee: Dayco Corporation, Dayton, Ohio

[21] Appl. No.: 620,234

[22] Filed: Jun. 13, 1984

[51] Int. Cl.[4] .................. B65H 69/02; B31F 5/00; G03D 15/04; B29C 19/02
[52] U.S. Cl. .................................. 156/159; 156/158; 156/245; 156/272.4; 156/273.7; 156/296; 156/304.1; 156/304.5; 156/304.6; 156/258; 156/309.6; 264/25; 264/248
[58] Field of Search ................. 156/153, 158–159, 156/196, 242, 244.11, 244.17, 244.22, 244.23, 244.27, 245, 272.2, 272.4, 273.7, 273.9, 304.1, 304.2, 304.5, 309.6, 295–296, 303.1, 304.6, 258, 73.2; 264/25, 248

[56] References Cited

U.S. PATENT DOCUMENTS

| | | |
|---|---|---|
| 2,393,541 | 1/1946 | Kohler . |
| 2,700,634 | 9/1949 | Ackerlind . |
| 3,276,941 | 10/1966 | Burns .............................. 156/304.5 |
| 3,367,808 | 2/1968 | Edwards .......................... 156/272.4 |
| 3,461,014 | 8/1969 | James . |
| 3,462,336 | 8/1969 | Leatherman . |
| 3,574,031 | 5/1971 | Heller et al. . |
| 3,620,875 | 11/1971 | Guglielmo . |
| 3,620,876 | 11/1971 | Guglielmo . |
| 3,709,775 | 1/1973 | James . |
| 3,802,985 | 5/1974 | Leatherman . |
| 3,902,940 | 9/1975 | Heller et al. . |
| 3,923,580 | 12/1975 | Leatherman . |
| 3,941,541 | 3/1976 | Heller et al. . |
| 3,945,867 | 3/1976 | Heller et al. . |
| 3,996,090 | 12/1976 | Leatherman . |
| 4,000,760 | 1/1977 | Heller et al. . |
| 4,067,765 | 1/1978 | Heller et al. . |
| 4,239,575 | 12/1980 | Leatherman . |

FOREIGN PATENT DOCUMENTS 1125155  6/1982  Canada .

Primary Examiner—Edward Kimlin
Assistant Examiner—Merrell C. Cashion
Attorney, Agent, or Firm—Joseph V. Tassone; David E. Wheeler

[57] ABSTRACT

The present invention provides a method for making a thermoplastic mandrel in which at least two sections of a thermoplastic rod, comprising a thermoplastic material which has been compounded with a finely divided metal or a metallic oxide filler, is subjected to a high voltage electrical induction field in a mold, causing fusion of the rod ends. Prior to the fusion, the ends of the thermoplastic rod are cut in a wedge shape, and in the preferred method, the wedge shaped ends meet at an angle of 90° and are pressed together in the mold. The heat resulting from energizing the metal filler in said thermoplastic rods by induction, causes simultaneous melting of both thermoplastic rod ends and subsequent fusion of said rod ends. The thermoplastic mandrel made according to this method has a bond at the splicing point which is smooth, flash free, fused, solid and seamless, said mandrel being free of warping, shrinking and deformation.

10 Claims, 2 Drawing Figures

METHOD OF SPLICING A THERMOPLASTIC MANDREL AND A MANDREL MADE BY SAID METHOD

BACKGROUND OF THE INVENTION

1. Field of the Invention

The present invention relates to a method of making a thermoplastic mandrel which can subsequently be used in the manufacture of hose. This invention also relates to a mandrel made by such a method.

2. Prior Art Statement

Ordinarily, when making hose by the mandrel method, a wire mandrel is used. Wire has the disadvantages that it is relatively expensive to use, is heavy, and if damaged or worn, it cannot be easily returned to a usable condition. It has been found, on the other hand, that a mandrel made of thermoplastic material can be made having suitable characteristics with regard to rigidity, stiffness, and flexibility such that it is suitable for use in place of a wire mandrel in most applications. A mandrel made of thermoplastic material has the advantage that the mandrel is lighter than the corresponding wire mandrel, it is cheaper to produce, and when said mandrel is damaged or worn, the thermoplastic material can be easily reformed to produce a new mandrel.

In producing a thermoplastic mandrel, it has been found that it is very difficult to splice thermoplastic rods to produce a mandrel of suitable length. Melt bonding or butt welding two mandrel ends by pressing them against a hot surface and then pressing them together, leaves too much flash, which must be trimmed off, on the mandrel joint.

When using a hot melt adhesive, which is applied between two thermoplastic rod ends, the ends of the thermoplastic rods have to be cut perfectly flush and perpendicular to the longitudinal axis of the mandrel. Any variation from the perpendicular, or gaps between the rod ends produces an incomplete bond. In addition, there is not enough mass in a melt adhesive film for sufficient interaction with the electrical induction field used in induction molding. This makes it necessary to use high energies in the induction field which in turn causes too rapid heating and subsequent burning of the adhesive. Also, the large mass of the mandrel, when compared with the small mass of the adhesive used, results in the phenomenon that the mandrel acts as a heat sink, and the mandrel does not get hot enough to melt, while the adhesive gets so hot that it burns. It has been found that induction heated hot melt adhesive films bond thermoplastic polyester mandrels only one time in twenty.

It is known to use heat generating particles in an electric inductive field to produce a bond in plastic hose and similar items as is illustrated by Heller et al in U.S. Pat. Nos. 3,574,031; 3,945,867; and 4,067,765; and 4,000,760.

A method for producing heat sealing and bonding using a magnetic induction method, and the products produced thereby are described by James in U.S. Pat. Nos. 3,461,014 and 3,709,775.

A composition adapted for inductive heating and a method for using the same is described by Kohler in U.S. Pat. No. 2,393,541.

Adhesives employing non-corrosive ferromagnetic particles which are used to bond thermoplastics by the use of inductive heating are described by Guglielmo et al in U.S. Pat. Nos. 3,620,875 and 3,620,876.

It is known to disperse inductively activated material in the body of an object that is subsequently to be attached to a plastic fitting as is disclosed by Leatherman in U.S. Pat. No. 3,923,580.

Other patents that deal closely with the bonding of thermoplastics include the following: U.S. Pat. Nos. 2,700,634; 3,462,336; 3,396,258; 3,802,985; 3,462,336; 3,996,090; 4,239,575; 3,900,360; 3,941,641; 4,029,837; 4,035,547; 3,528,867; 3,802,985; 3,941,641; 3,902,940; and Canadian Pat. No. 1,125,155.

SUMMARY OF THE INVENTION

It has been found that compounding a metallic magnetic coupling agent into the thermoplastic material of thermoplastic rods, instead of including it in an adhesive film, increases the heating of the mass of thermoplastic material in the rods and produces a molten lake of material which molds together to form a weld joint. Also, it has been found that, instead of butt welding, when thermoplastic rod ends are cut in a wedge shape and the ends are turned at a 90° angle with respect to each other, and pressure is applied to both thermoplastic rods, this forces flow of the thermoplastic material and eliminates a seam line at the place of bonding. Also, it has been found that by incorporating the metallic material in the body of the thermoplastic rods, that reduced energy can be used in the electric induction field, and this, together with an increased pulse time, prevents the plastic from burning during the bonding.

Accordingly, the present invention provides a method of splicing a thermoplastic mandrel comprising the steps of providing at least two sections of thermoplastic rod which has been compounded with metallic or metallic oxide filler. The ends of the thermoplastic rods are cut in a wedge shape, and said wedge-shaped ends are oriented at an angle of about 90° with respect to one another in a mold cavity. A small amount of force is exerted against both rods to force end to end contact of the wedge-shaped ends. The thermoplastic rods are subjected to a high voltage electrical induction field in the mold. The heat resulting from energizing the metallic material in the thermoplastic rods causes a simultaneous melting and flowing together of the thermoplastic rod ends. Total fusion is obtained when the thermoplastic material cools.

A thermoplastic mandrel made according to the method of the invention has a bond at the splicing point which is smooth, flash free, fused, solid and seamless, and the mandrel is free of warping, shrinking, and deformation.

Other details, features, objects, uses and advantages of the present invention will become apparent from the embodiment herein presented in the following specification, drawings and claims.

DESCRIPTION OF THE PREFERRED EMBODIMENTS

Figure 1:
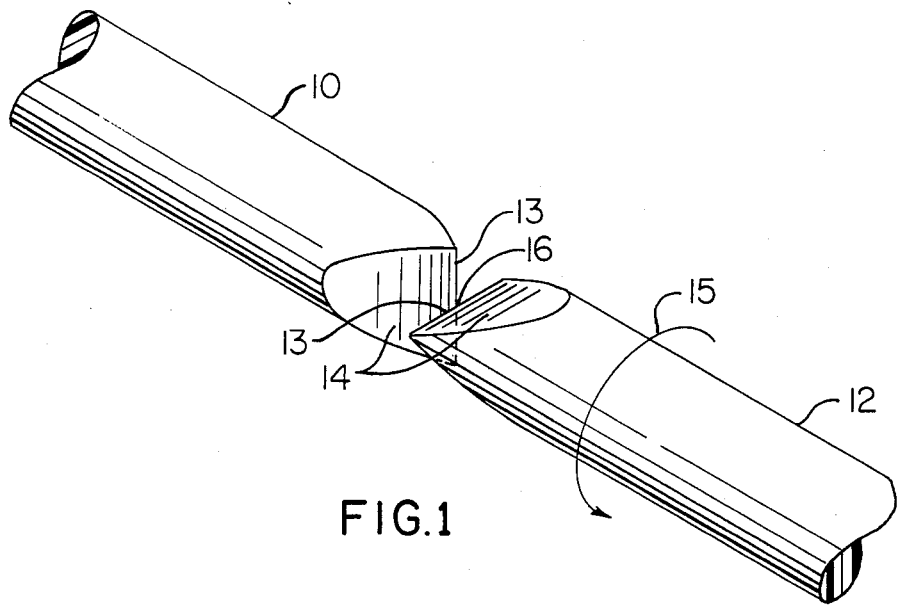
FIG. 1 illustrates two thermoplastic rods, that have been cut in a wedge shape, and have been turned at 90° with respect to one another

FIG. 1 illustrates two thermoplastic rods 10 and 12 which have been prepared for splicing according to the preferred method of the present invention. Each of the thermoplastic rods 10 and 12 have cut ends 14 which are cut having a wedge shape. As used herein, wedge shaped refers to an angled cut transversing the ends of the rod. In the preferred embodiment, a wedge shape is formed by two angled cuts that start at opposite sides of the rod and meet substantially at the longitudinal axis of the rod to form a straight line designated as apex 13. Thermoplastic rod 12 has been rotated as is illustrated by arrow 15 such that the wedge shaped ends 14 meet at a single point 16. This orientation is preferred during the splicing step of the method of the invention as is illustrated in FIG. 2 and described below.

Figure 2:
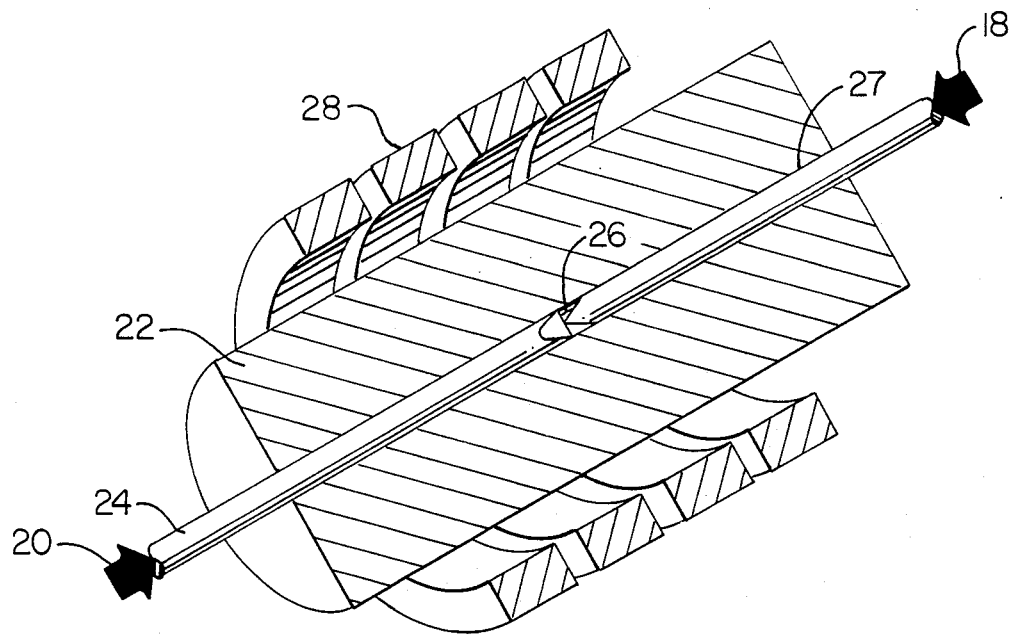
FIG. 2 illustrates a pair of thermoplastic rods in a clamshell mold in an electric induction coil.

FIG. 2 illustrates a clamshell mold 22 which has been placed inside an induction field coil 28. Reference numeral 24 represents that when two thermoplastic rods 10 and 12 have been connected at splicing point 26, that a single mandrel 24 has been formed.

As is known to those skilled in the art, different thermoplastic materials may be preferred for different applications of the present invention. The thermoplastic material which may be used in this invention is any thermoplastic material that has sufficient toughness and a sufficiently high melting temperature such that it can be used as a mandrel without breaking and tearing and, in those applications where a hose is vulcanized on said mandrel, without melting. Examples of thermoplastic materials that may be used are polypropylene, polyallomer, polymethylpentene, thermoplastic polyesters, nylon and compatible mixtures thereof.

In preparing thermoplastic rods 10 and 12 for splicing into a mandrel, it has been found preferable to compound the thermoplastic material used to form rods 10 and 12 with a metallic material which can be activated by an electric induction current to produce heat. Any powdered metals and/or metal oxides or mixtures thereof known in the art to be suitable for this purpose can be used. For the purposes of this invention, it is preferred to use one of the oxides of iron such as $Fe_2O_3$ or $Fe_3O_4$.

In the method of the invention, thermoplastic rods 10 and 12 are formed by extrusion. The ends of thermoplastic rods 10 and 12 are cut on an angle from opposing sides thereof to produce wedge-shaped ends 14. The thermoplastic rods 10 and 12 are then clamped into clamshell mold 22. The top half (not shown) of the clamshell mold is positioned over the bottom half of the clamshell mold 22 and force is exerted on each rod in the direction of arrows 18 and 20 to insure a forced contact between the ends 14 of thermoplastic rods 10 and 12. Preferably, the apexes 13 of wedge-shaped ends 14 of thermoplastic rods 10 and 12 meet to form an angle of rotation of between 5° and 175° at point 16 where the apexes 13 meet. The angle of the cuts forming the wedge shaped ends 14 are not critical. Best results will be obtained, however, if the angle of the wedge is between 20° and 150°. The larger angled wedges require less flow of thermoplastic material during bonding, and smaller angled wedges permit better penetration in the flow. Preferably, the angle of the wedge will be about 90°. In the preferred embodiment, the apexes 13 meet at an angle of about 90°. After rods 10 and 12 are clamped into the clamshell mold 22, the electric induction coil 28 is activated, thereby activating the metallic or metallic oxide filler in the thermoplastic rods. The activation of the metallic or metallic oxide material causes a heating of thermoplastic rods 10 and 12, which causes the thermoplastic material to melt, and because of the force exerted in the direction of arrows 18 and 20, the thermoplastic material in rods 10 and 12 is forced to flow together to form a splice at 26. Force may be exerted on thermoplastic rods 10 and 12 by any means known in the art. The force may be exerted automatically using machines suitable for that purpose, or it may be applied manually. Ordinarily, a relatively small force will be sufficient to cause the thermoplastic material in rods 10 and 12 to flow. It is possible to exert force directly on the extended portions of the rods since only that portion of the rod that is within the induction coil is heated. The flowing thermoplastic material is contained in a mold cavity 27 and is shaped accordingly. After fusion, the splice 26 is permitted to cool in the ambient air. Under normal conditions, a period of cooling of about 30 seconds will be sufficient. The bond formed at splice 26 is formed smooth, flash free, completely fused, solid and seamless. Since the thermal shock and burning which occurs when a melt adhesive, which contains a metal or a metal oxide is used, is avoided, the mandrel formed is free of warping, shrinking and deformation.

The clamshell mold can be made of any material that substantially is not effected by the induction field and which will not melt due to the melting of the thermoplastic material of the thermo-plastic rods. Accordingly, plastics having a high melting point, vulcanized rubber, ceramics, and glass materials can be used for forming said molds.

As will be apparent to those skilled in the art, the thermoplastic material of rods 10 and 12 can be forced to flow by using thermoplastic rods which are slightly larger than mold cavity 27. In such a case, the pressure exerted by the mold cavity on the oversized rods will force the thermoplastic material to flow when it is melted, and such pressure is within the definition of the force described in the claim below. Any similar means for causing the thermoplastic material to flow which will be apparent to those skilled in the art is intended to be covered by the present invention.

In the method of the invention, it has been found that an electrical induction field with a pulse of about one second produced from a 20 KW induction generator is sufficient to cause melting and flowing of the thermoplastic material. It will be recognized by those skilled in the art that variations in the time and on the strength of the pulse may be used depending on the thermoplastic material that is used in the rods 10 and 12.

Although the quantities of metallic material may vary depending upon the specific properties desired, for the purposes of this invention, it is preferred that the thermoplastic material contain about 20% by weight of the induction-activated metallic material.

In some applications, it has been found that by dipping the ends of the thermoplastic rods 14 into a solvent before bonding in the mold cavity 27, that the solvent plasticizes the thermoplastic material and enhances the flow of the thermoplastic material during the bonding.

For the purposes of this invention, it is preferred that a thermoplastic polyester which is known by the trademark Hytrel, which is available from E. I. Du Pont de Nemours & Co., Inc., Wilmington, Del. 19898, be used to form the thermoplastic rods 10 and 12.

The following example illustrates the method of the present invention:

EXAMPLE

The thermoplastic material of the example was prepared by Reed Plastics Corporation, Holden Industrial Park, Holden, Mass. 01520, and given the designation C-PES-1520. The thermoplastic material contained 80% Hytrel and 20% $Fe_2O_3$, Pfizer 2230. The thermoplastic material was extruded into a ⅜" mandrel to study its welding properties. The rods produced by the extrusion were cut having wedge-shaped ends, one of the rods was rotated 90°, and the rods were placed into a clamshell mold. A small force was exerted on the rods to insure end to end contact in the mold. A consistent weld was obtained by applying 36% induction power in pulse times ranging from about 0.65 to 0.85 seconds. The induction apparatus was set as follows:

1. A 1 inch 6 turn induction coil was used,
2. a tank coil was used on the sixth turn,
3. the choke coil was set at eight meg. hertz,
4. the tank capacitor was set at 2500 pico farads,
5. the grid tank adjustment was set at 55%,
6. grid D.C. amps were set at 0.44,
7. the plate D.C. amps were set at 0.7,
8. and the A.C. voltage was set at 12.6.

The 154 inch plastic mandrel produced by the example had a breaking strength of about 200 p.s.i. When five samples made by this method were tested for tensile strength, only one of these samples broke at the weld joint. The data on the tensile test for these five samples is provided below:

| Sample | Force Exerted At Break Point (p.s.i.) | Description of Result |
| --- | --- | --- |
| 1. | 198 | mandrel pulled out of coupling |
| 2. | 196 | mandrel pulled out of coupling |
| 3. | 209.9 | mandrel broke at the coupling |
| 4. | 213.0 | mandrel pulled out of the coupling |
| 5. | 204.0 | mandrel weld joint broke |

While present exemplary embodiments of the novel product and method of this invention are illustrated and described herein, it is to be understood that the invention may be otherwise variously embodied and practiced within the scope of the following claims.

What is claimed is:

1. In a method of making a thermoplastic mandrel comprising the steps of providing at least two thermoplastic rods and thermally bonding the ends of said rods together, the improvement comprising the steps of: incorporating a metallic or metallic oxide filler in the thermoplastic material used to make said thermoplastic rods; forming said rods from said thermoplastic material; cutting the ends of said rods to form wedge shaped ends having apexes; turning said wedge shaped ends of said rods such that the apexes of said wedge shaped ends meet at an angle of rotation of between 5° and 175°; disposing said rods in a mold cavity with forced contact between the ends of said thermoplastic rods; subjecting said rods to a high voltage electrical induction field, the heat resulting from energizing the metallic material in said thermoplastic rods simultaneously causing the melting of both said thermoplastic rod ends; forcing said rod ends together, causing total flowing together of said thermoplastic rod ends; and cooling said rod ends, causing the rod ends to fuse together.

2. A method according to claim 1 in which the apexes of said wedge shaped ends meet at an angle of about 90°.

3. A method according to claim 2 which further comprises the step of dipping said rod ends into a solvent prior to clamping them in said mold, said solvent acting to plasticize said rod ends.

4. A method according to claim 1 further comprising the step of cooling a splice provided therein by ambient air cooling for about 30 seconds.

5. A method according to claim 1 in which said metallic material is $Fe_2O_3$ or $Fe_3O_4$.

6. A method according to claim 1 in which said mold cavity is in a clamshell mold.

7. A method according to claim 1 in which said thermoplastic rod is made of a thermoplastic polyester which has been specially compounded with a metal powder or a metal oxide.

8. A method according to claim 1 in which said thermoplastic material contains about 20% by weight metal oxide or finely divided powdered metal.

9. A method according to claim 8 in which said thermoplastic bonding material is a thermoplastic polyester admixed with about 20% by weight $Fe_2O_3$ or $Fe_3O_4$.

10. A method according to claim 1 in which said electrical induction field is produced by about a one second pulse from a 20 KW induction generator.

* * * * *